Feb. 28, 1950 N. SLOANE ET AL 2,498,770

ARTICLE HOLDING SUPPORT FOR TELEPHONE HANDSET BASES

Filed Nov. 23, 1946

INVENTORS
Nathan Sloane and
Max Sloane
BY Louis Schumacher
ATTORNEY

UNITED STATES PATENT OFFICE 2,498,770

ARTICLE HOLDING SUPPORT FOR TELEPHONE HANDSET BASES

Nathan Sloane and Max Sloane, Brooklyn, N. Y.

Application November 23, 1946, Serial No. 711,866

5 Claims. (Cl. 45—.5)

This invention relates to accessories of a portable nature for the base of a telephone hand-set.

An object of the invention is to provide a device of the character described having an improved portable article-holding support for a telephone hand-set base, whereby articles such as writing implements are so peculiarly associated with the telephone as to be instantly and conveniently accessible for use.

Another object of the invention is the provision of a device of the nature set forth comprising a compartmented portable base having improved means for connecting the same to a telephone hand-set base at the legs of the latter in a simple and reliable manner to constitute a permanent portable unit.

Another object of the invention is to furnish a device of the type mentioned having a drawer containing support adapted to symmetrically and evenly underlie a telephone hand-set base in a neat and relatively inconspicuous manner, the drawer being easily opened to expose a pad, pencil or other elements that are generally used in making notes while conversing on the telephone, and the drawer being adapted to hold a pad in writing position.

Another object of the invention is to furnish a device of the class alluded to having improved means comprising identical or interchangeable connecting elements for reliably securing the compartmented support to the telephone base without requiring any change in construction or arrangement of the latter.

Another object of the invention is the provision of an improved device capable of being molded or formed in a very inexpensive manner and requiring a minimum number of tools or dies for its production, with the structures being such as to permit rapid quantity manufacture.

Another object of the invention is to furnish a device of the type mentioned comprising improved means having the dual function of retaining the drawer base in assembled position and of engaging the latter with the base of the telephone.

Other objects and advantages of the invention will become apparent as the specification proceeds.

With the aforesaid objects in view, the invention comprises the novel features, combinations and arrangements of parts hereinafter described in their preferred embodiments, pointed out in the subjoined claims, and illustrated in the annexed drawing, wherein like parts are designated by the same reference characters throughout the several views.

Figures 1, 2, 3, 4, 5, 6, 7, 8:
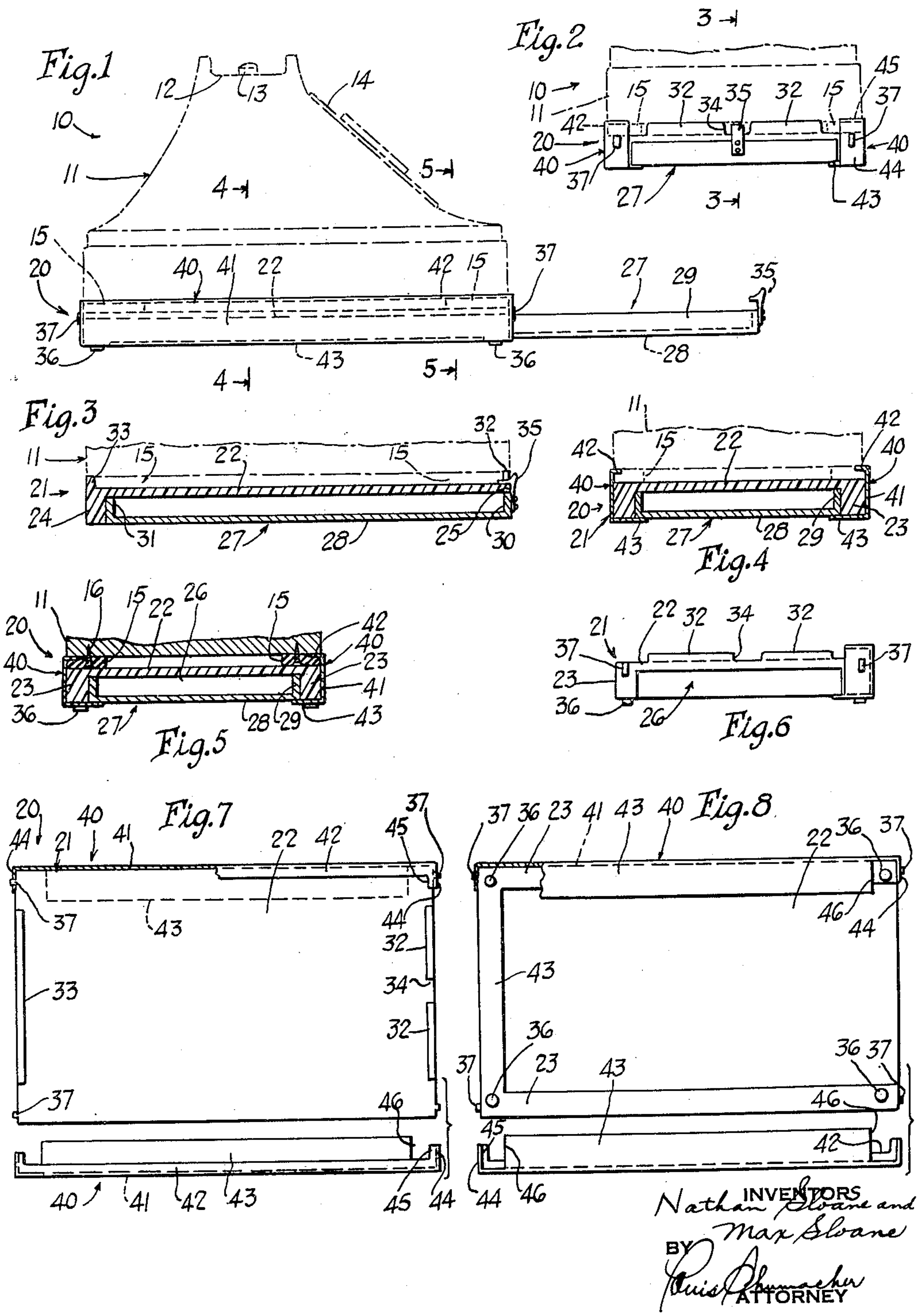
Figure 1 is a view in side elevation with the drawer in open position showing a device embodying the invention as applied to the base of a telephone hand-set herein shown in dot-dash lines.
Fig. 2 is a view in front elevation thereof, with a portion of said base removed.
Fig. 3 is a sectional view taken on the line 3—3 of Fig. 2 but with the drawer in closed position.
Fig. 4 is a sectional view on the line 4—4 of Fig. 1.
Fig. 5 is a sectional view on the line 5—5 of Fig. 1 but showing a portion of the telephone base in full lines.
Fig. 6 is a view in front elevation of the device with the drawer and with one of the securing elements removed.
Figs. 7 and 8 are respectively top and bottom plan views of the device with portions in supported position and other portions broken away and in section.

The advantages of the invention as here outlined are best realized when all of its features and instrumentalities are combined, but useful embodiments may be produced involving less than the whole.

It will be obvious to those skilled in the art to which the invention appertains, that the same may be incorporated in several different construtions. The accompanying drawing, therefore, is submitted merely as showing a preferred exemplification of the invention.

Referring in detail to the drawing, 10 denotes a device embodying the invention. The same may comprise a conventional base 11 of a telephone hand-set, this base having the usual cradle 12 for mounting the hand-set which is not shown, to thus manipulate the switch element 13. At 14 is the usual dial means. At the bottom of the base 11 there are the corner legs 15 which are generally of rectangular shape and covered with a soft material that will not abrade the support surface. For the purposes of the present disclosure, it suffices to indicate these legs as of homogeneous construction formed of a cushioning or yielding material, with each leg being secured by a single substantially central screw 16. A feature of the arrangement is such that a thin sheet-metal member is adapted to be inserted over the legs along certain edges thereof as shown in Fig. 5 hereinafter described.

The device provides support 20 embodying the invention. This support is of any suitable shape to conform to the base of the telephone and in this instance is rectangular and is relatively thin to simulate the inconspicuous flat plate-like member. This support 20 comprises a main member 21 having a thin preferably continuous top plate 22 and having at its underside a flange continuous along the sides and rear thereof, but open at the front. The flange thus provides the side walls 23 and the rear wall 24. The side walls may be relatively thick, and to conserve material may be molded hollow with downward opening spaces not shown. These side walls terminate at the front edge 25, thus providing a compartment 26. The latter may be closed at the bottom by a surface on which the walls 23 and 24 rest, but preferably a drawer 27 is provided slidable in the compartment 26. This drawer may be a simple box-like structure having a bottom wall 28, side walls 29 and front and end walls 30, 31 respectively. The height of the walls of the drawer may be substantially equal to that of the walls of the member 21. The top face of the wall 22 may be plane throughout, except that there are furnished lips 32 at the front and a lip 33 at the rear, this being of such height as to close the space between the telephone base legs 15, the lips 32 providing therebetween a space 34 for a catch 35 secured to the front wall 30 of the drawer 27. This catch may be in the nature of any resilient element or clip adapted to slide into the space 34 and to frictionally engage the adjacent top surface of the wall 22 to thus releasably hold the drawer closed. The flange 23, 24 of the supporting member 21 may be formed with bottom teats 36 to afford a smooth and uniform rest on the surface of the table or the like. At the front and rear of the member 21 there are provided lugs 37 formed on the side walls 23 and which terminate in the plane of the top surface of the wall 22 as clearly shown in Fig. 6 to facilitate constructing of the member 21 in a simple mold. It will be perceived that the structure of the member 21 is such that it is free of any undercut parts and can thus be formed in a simple mold that is operative at high speed. Accordingly, the member 21 may be made by injection molding of plastic, but it can also be cast or stamped of metal. Upon opening the mold, the member 21 can be readily stripped out by the usual automatic ejector pins.

For securing member 21 to the telephone base 11 and for simultaneously assembling the drawer 27 with said member, there are provided the identical straight elements 40 whereby these elements may be interchangeably used as rights and lefts. Each element 40 is constructed of thin sheet metal such as aluminum or the like and each is of generally channel shape having a web 41, a relatively narrow top flange 42 and a relatively wide bottom flange 43. These elements 40 terminate in angular structures which are identical at their opposite ends. Thus there is a portion 44 connected to the web 41 and having top flanges 45 continuous with and at an angle to the flanges 42 but being desirably slightly narrower than the latter. These flanges 42 and 45 are adapted to engage over the telephone base legs 15 to secure a reliable engagement. The front walls 44 are perforated for a snap-in engagement and reception of the lugs 37, the element 40 having sufficient resilience for this purpose. The bottom flanges 43 may be cut to terminate at the edges 46 to provide clearance openings for the teats 36. These bottom flanges 43 may serve as supports for the sliding drawer 27 and may have some resilient engagement with the bottom wall 28 thereof for snug engagement to retain the drawer closed whereby the catch 35 may be omitted.

In assembling the device 10, the telephone base 11 is rested on the top wall 22 of the member 21, the bottom walls 23 and 24 providing a strong and adequate support. While the top wall 22 forms a neat and uniform closure for the drawer 27, this top wall may be skeletonized because the telephone base 11 will itself furnish such a closure. Now the locking elements 40 are applied to the opposite sides of the device with the top flanges 42 and 45 being readily slipped over the legs 15 due to the yielding nature thereof, and being thus neatly engaged between the legs and the main part of the telephone base. Because the elements 40 are interchangeable, they may be used at either side of the device. Now the drawer 27 may be inserted into the compartment 26 and into the guideways afforded by the bottom flanges 43 of the elements 40. The angular structure of the elements is suitably reenforced, for example by the flanges 45 so that they will not spring away from the legs 15. There is no possibility of either longitudinal or lateral relative movement between the support 20 and the telephone base. The wall portions 44 clear the drawer to facilitate its movement. The lips 32 and 33 cooperate with the elements 40 to completely close any space around the telephone base.

Bottom flanges 43 resiliently engage the drawer to keep it closed, and additional closure may be provided by the clip 35 which engages as the drawer is closed. In use, a person speaking on the telephone has instantly available writing implements such as a pad and pencil which may be carried in the drawer, the latter is easily opened and may be used as a support for the pad in writing position, particularly as the bottom of the drawer is very close to the support table. The device 20 is simple, durable, compact, inexpensive, neat in appearance, and easy to install, and forms a portable unit with the telephone base so that the latter may be moved around from place to place with the supporting device 20 retained in operative position thereon. The member 40 may be considered as a reenforcement for the thin, attractive, relatively flexible elements 40, which may be engageable with any shoulders on the telephone base, of which the legs 15 are illustrative. The base 11 may be regarded as denoting solely the case for the local telephone controls.

We claim:

1. A device including a supporting member, channel elements bordering said member, means detachably connecting said elements to the member, the elements having lower flanges cooperating with the member to form guides for slidably mounting a drawer, the elements having upper flanges spaced above the member for engaging over portions of an article that is supported on the member.

2. A device including a portable supporting means for the base of a telephone hand-set, including a supporting member having a bottom recess forming a compartment open at the front of the member, means connecting the member to the base comprising side strip elements having bottom flanges cooperating with the member to form drawer guides for the compartment, and means detachably connecting the elements to the member.

3. A device including an article supporting, plate-like horizontal member having a bottom recess adapted to form a compartment open at the front, side strip elements detachably connected to the member and having bottom flanges forming drawer guides for the compartment, the elements having article engaging top flanges spaced above the member and each element having short, resilient end portions so that each element is of generally U-shaped form, means for snap-like detachable connection of the end portions with the supporting member, at the front and rear ends of the latter, with the end portions resiliently cooperating to effect the detachable connection.

4. A portable supporting device for a rectangular shaped base of a telephone hand-set comprising a supporting member shaped to conform to said base and to receive a horizontal slidable drawer, straight channel elements detachably connected to opposite sides of the member, each of the elements being formed with a lower flange cooperating with the member to form supporting guides for said drawer and an upper flange spaced above said member for engaging over portions of the base of the telephone, each of said elements terminating in resilient end portions, said portions having means for detachably engaging said supporting member at the front and rear of the latter.

5. A portable supporting device for a shouldered base of a telephone hand-set comprising a supporting member having a compartment for receiving a horizontal drawer, elements having upper portions engaging over the shoulders of the base and lower portions cooperating with the supporting member to form guides for mounting the drawer, said elements consisting of a relatively light weight, flexible material, and the supporting member having means cooperating with said elements to reenforce the same and to strengthen the supporting device to carry the weight of the telephone hand-set.

NATHAN SLOANE.
MAX SLOANE.

REFERENCES CITED

The following references are of record in the file of this patent:

UNITED STATES PATENTS

| Number | Name | Date |
|---|---|---|
| 1,078,117 | Wood | Nov. 11, 1913 |
| 1,168,760 | Sworzyn | Jan. 18, 1916 |
| 1,172,382 | Merritt | Feb. 22, 1916 |
| 1,213,185 | Gee | Jan. 23, 1917 |
| 1,659,164 | Sanders | Feb. 14, 1928 |
| 1,851,445 | Rappaport | Mar. 29, 1932 |
| 2,283,690 | Munson | May 19, 1942 |
| 2,432,760 | Higbee | Dec. 16, 1947 |